(12) United States Patent
Prodan et al.

(10) Patent No.: US 8,763,141 B2
(45) Date of Patent: Jun. 24, 2014

(54) METHOD AND SYSTEM FOR SECURING A HOME DOMAIN FROM EXTERNAL THREATS RECEIVED BY A GATEWAY

(75) Inventors: Rich Prodan, Niwot, CO (US); Jeyhan Karaoguz, Irvine, CA (US); Xuemin Chen, Rancho Santa Fe, CA (US); Wael William Diab, San Francisco, CA (US); David Garrett, Tustin, CA (US); David Lundgren, Mill Valley, CA (US)

(73) Assignee: Broadcom Corporation, Irvine, CA (US)

( * ) Notice: Subject to any disclaimer, the term of this patent is extended or adjusted under 35 U.S.C. 154(b) by 369 days.

(21) Appl. No.: 12/982,171

(22) Filed: Dec. 30, 2010

(65) Prior Publication Data

US 2011/0302663 A1 Dec. 8, 2011

Related U.S. Application Data

(60) Provisional application No. 61/351,696, filed on Jun. 4, 2010.

(51) Int. Cl.
*G06F 21/00* (2013.01)

(52) U.S. Cl.
USPC ............... 726/26; 726/12; 726/22; 726/23; 726/24; 726/27; 713/189; 713/193

(58) Field of Classification Search
None
See application file for complete search history.

(56) References Cited

U.S. PATENT DOCUMENTS

| | | | | |
|---|---|---|---|---|
| 5,960,445 | A  * | 9/1999 | Tamori et al. | 717/168 |
| 8,051,478 | B1 * | 11/2011 | Rajan et al. | 726/22 |
| 2004/0047358 | A1 * | 3/2004 | Chen et al. | 370/401 |
| 2006/0156399 | A1 * | 7/2006 | Parmar et al. | 726/22 |
| 2006/0236127 | A1 * | 10/2006 | Kurien et al. | 713/193 |
| 2007/0061596 | A1 * | 3/2007 | Ferguson et al. | 713/193 |
| 2007/0107019 | A1 * | 5/2007 | Romano et al. | 725/80 |
| 2007/0130585 | A1 * | 6/2007 | Perret et al. | 725/46 |
| 2007/0136579 | A1 * | 6/2007 | Levy et al. | 713/168 |
| 2007/0192854 | A1 * | 8/2007 | Kelley et al. | 726/22 |
| 2007/0237080 | A1 * | 10/2007 | Savagaonkar | 370/235 |

FOREIGN PATENT DOCUMENTS

KR 20090058358 * 6/2009 ............. G06F 21/00

* cited by examiner

*Primary Examiner* — Jung Kim
*Assistant Examiner* — Adrian Stoica
(74) *Attorney, Agent, or Firm* — Foley & Lardner LLP; Christopher J. McKenna; Paul M. H. Pua

(57) ABSTRACT

A method and system are provided in which a broadband gateway may handle at least one physical layer connection to at least one corresponding network access service provider. The broadband gateway may receive content comprising an application through the at least one network access service provider and may store the content in a first portion of a memory. A software agent may be utilized to request the content and/or to store the received content in the first portion of the memory. The broadband gateway may execute the application after access by the application to a second portion of the memory is disabled. After the execution of the application is completed, access to the second portion of the memory may be enabled. In some instances, the application may be verified to determine whether it is secure for utilization and/or distribution. When verification fails, the application may be deleted.

19 Claims, 8 Drawing Sheets

METHOD AND SYSTEM FOR SECURING A HOME DOMAIN FROM EXTERNAL THREATS RECEIVED BY A GATEWAY

CROSS-REFERENCE TO RELATED APPLICATIONS/INCORPORATION BY REFERENCE

This application claims the benefit of U.S. Provisional Patent Application 61/351,696, filed on Jun. 4, 2010.

This application also makes reference to:

U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/982,414 filed on Dec. 30, 2010; and
U.S. patent application Ser. No. 12/981,733 filed on Dec. 30, 2010.

Each of the above stated applications is hereby incorporated herein by reference in its entirety.

FIELD OF THE INVENTION

Certain embodiments of the invention relate to broadband access. More specifically, certain embodiments of the invention relate to securing a home domain from external threats received by a gateway.

BACKGROUND OF THE INVENTION

As the use of home networks grow in popularity, the capabilities of today's gateway devices may not be adequate to support certain applications and content to be provided through such networks.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for securing a home domain from external threats received by a gateway, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for securing a home domain from external threats received by a gateway. In accordance with various embodiments of the invention, a broadband gateway may be communicatively coupled to multiple devices in a home network and may be operable to handle physical layer connections to a plurality of corresponding network access service providers. The broadband gateway may receive content comprising an application through the at least one network access service provider and may store the content in a first portion of a memory. A software agent may be utilized to request the content and/or to store the received content in the first portion of the memory. The broadband gateway may execute the application after access by the application to a second portion of the memory is disabled. After the execution of the application is completed, access to the second portion of the memory may be enabled. In some instances, the application may be verified to determine whether it is secure for utilization and/or distribution. When verification fails, the application may be deleted.

A broadband gateway may run or execute a wide range of software programs or applications that may be critical not only to the operation of the broadband gateway, but also to the operation of the home network associated with the broadband gateway. By enabling a broadband gateway to have an open platform or framework in which new broadband-based applications and/or content may be brought into the home, the broadband gateway may also be made more vulnerable to external threats. For example, when allowing third-party content, including software programs or applications, to be downloaded into a broadband gateway, important operations and/or core functionality of the broadband gateway, such as digital rights management (DRM) and/or data encryption operations, may need to be protected so as to not be compromised by the downloaded content. Accordingly, it may be important to isolate, contain, and/or quarantine content received by the broadband gateway in a secure or restricted area to enable the secure operation of the broadband gateway. In some instances, the software programs or applications within such content may not be used in the broadband gateway and/or may not be distributed to other devices connected to the broadband gateway through the home network until such content can be trusted.

Figure 1:
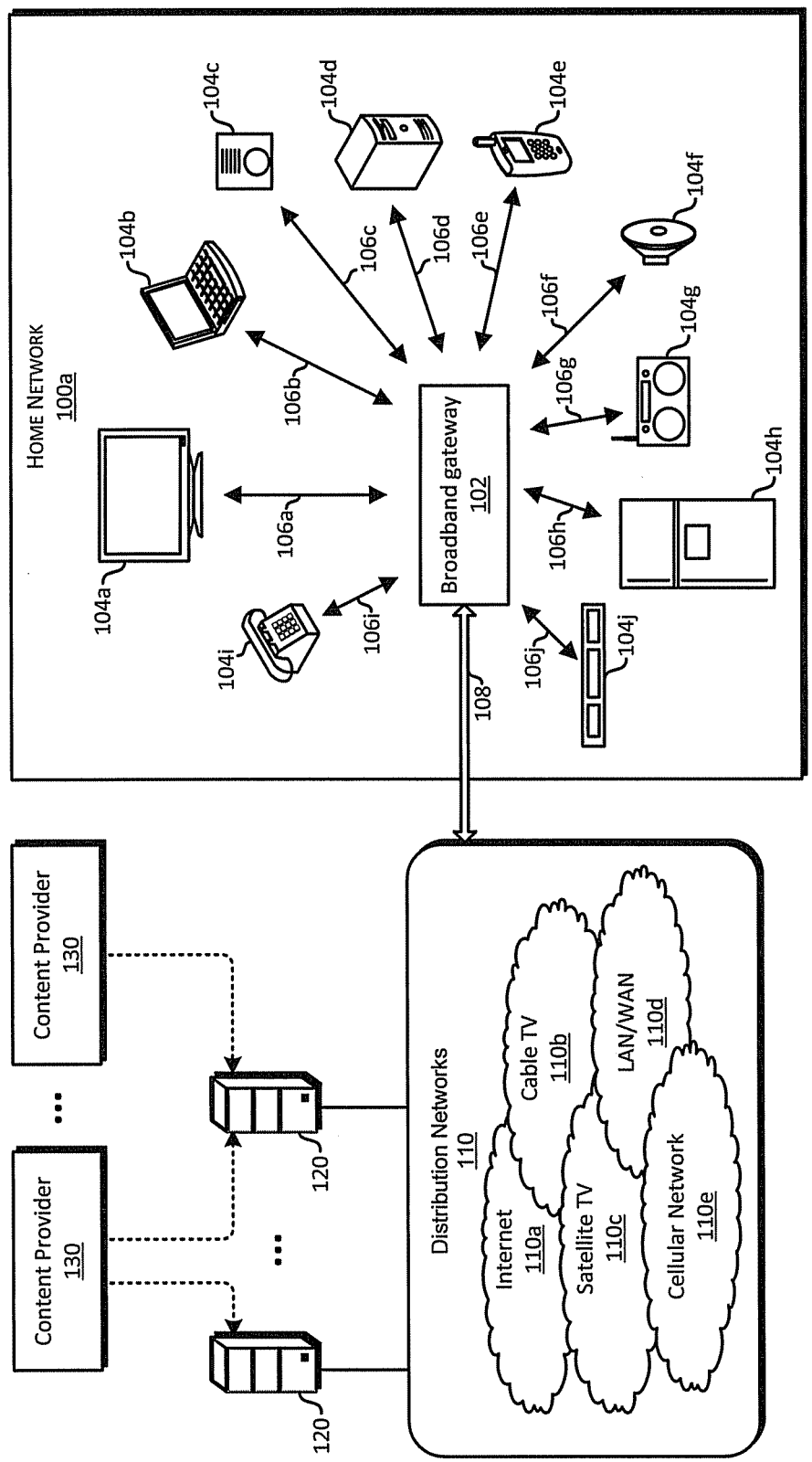
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of network access service providers 120, and a plurality of content providers 130. The home network 100a may be serviced by a broadband gateway 102.

The content providers 130 may generate, capture, and/or package content, such as multimedia content, for example, that may be distributed to end users. Content originating from the content providers 130 may be distributed to end users (e.g., consumers) by the network access service providers 120. The term "network access service provider" as utilized herein, may be distinguished from the more generic term "service provider" that may refer to services other than providing physical layer access to a network. An entity that functions as a network access service provider, however, may also provide content and/or services other than network access. In some instances, an entity that functions as a network access service provider may generate, capture, and/or package content, such as multimedia content, for example, that may be distributed to end users. The content received through the network access service providers 120 may comprise programming scheduling information, metadata associated with such programming information, and/or applications that enable handling such programming in the broadband gateway 102. In some instances, the metadata may originate in a server, such as a web server, associated with one or more of the content providers 130.

The network access service providers 120 may comprise various entities and/or networks that provide access to content and/or services using different access technologies, such as multimedia, television, Internet, phone, Ethernet, multimedia over coax alliance (MoCA), passive optical network (PON), and/or cellular services, for example, to a plurality of end users. The end users may utilize devices that may be configured to support the necessary networking and/or communication infrastructures and/or standards. For example, end users may utilize cellular devices or smartphones, personal computers (PCs), servers, and/or set-top boxes. Exemplary network access service providers may comprise, for example, cellular service providers (e.g., AT&T, Verizon), cable television (CATV) providers (e.g., Comcast, RCN, Cox), satellite television providers (e.g., DirectTV, DISH Network), Internet service providers (ISPs), digital subscriber line (DSL) providers, WiMAX providers, and/or plain old telephone service (POTS) providers. In an exemplary embodiment of the invention, the broadband gateway 102 may enable connecting to a plurality of network access service providers 120 to facilitate receiving content originating from one or more of the content providers 130. When more than one network access service provider 120 provides access to content and/or services to the broadband gateway 102, each network access service provider 120 may do so through a separate physical layer access. In an embodiment of the invention, a separate physical layer access may be enabled in the broadband gateway 102 by having a separate network interface for each network access service provider 120 within the broadband gateway 102.

The plurality of distribution networks 110 may comprise one or more networks that may be operable to enable wireless and/or wired communication among a plurality of entities based on one or more networking and/or communication infrastructures. In this regard, the plurality of distribution networks 110 may be utilized to enable distributing content generated by the content providers 130 and/or by the network access service providers 120 to end users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100a to provide connectivity between the home network 100a and the network access service providers 120, the distribution networks 110, and/or the content providers 130.

The broadband gateway 102 may comprise suitable logic, circuitry, interfaces, and/or code that may be operable to provide connectivity between one or more devices in a home network, such as the home network 100a, and a plurality of external networks. For example, the broadband gateway 102 may support configuring and/or using a plurality of broadband connections 108 to the distribution networks 110. The broadband connections 108 may comprise wired and/or wireless connections between the broadband gateway 102 and the distribution networks 110, which may enable communication between the broadband gateway 102 and the network access service providers 120. The broadband gateway 102 may operate as an interface device that may allow one or more network access service providers and/or content providers to interact with various devices in the home network. In this regard, the broadband gateway 102 may enable communication with each of the network access service providers 120 through separate interfaces. That is, each network access service provider 120 from the plurality of network access service providers 120 may interface with the broadband gateway 102 through a network interface that is separate and/or different from a network interface associated with each of the other network access service providers 120.

A single broadband gateway 102 may be operable to handle multiple physical layer access connections, where a physical layer may refer to an Open Systems Interconnection (OSI) layer 1. The connections may provide access to one or more of the distribution networks 110. The distribution networks 110 may be owned, operated, leased, or otherwise associated with different network access service providers 120. For example, one network access service provider 120 may provide network access to the broadband gateway 102 through a cable television connection over coaxial cabling associated with the CATV network 110b. In another example, a different network access service provider 120 may provide network access to the broadband gateway 102 through a DSL connection over twisted-pair cabling associated with the Internet 110a. In some instances, the broadband gateway 102 may be operable to concurrently communicate over several physical layer connections associated with the multiple network access service providers 120.

The broadband gateway 102 may be operable to perform and/or provide various services that may pertain to enabling and/or facilitating reception of various types of content, including multimedia content. The content may be delivered through one or more network access services providers 120 and their associated networks, which may include at least some portions of the distribution networks 110. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100a, using wired and/or wireless communication links.

Devices serviced by, and/or connected to the broadband gateway 102 may comprise content consuming devices and/or other, non-content consuming household or home devices that may be operable to interact with the broadband gateway 102. For example, the broadband gateway 102 may service, and/or may communicate with a plurality of home devices 104a-104j in the home network 100a. The home devices may comprise, for example, one or more of a television 104a, a laptop computer 104b, a detector 104c (e.g., a smoke detector, a carbon monoxide detector, a security alarm), a computer and/or server 104d, a mobile phone 104e, a speaker 104f, an AM/FM radio 104g, a phone 104h, an appliance 104i (e.g., refrigerator), and a digital video recorder (DVR) or personal video recorder (PVR) 104j. The broadband gateway 102 may interact with each of the home devices 104a-104j via links 106a-106j, which may be supported by the broadband gateway 102 and the corresponding home device. For example, the link 106a between the broadband gateway 102 and the television 104a may comprise a High-Definition Multimedia Interface (HDMI) cable and/or 60 GHz WiGig wireless connection/interface. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a phone line. The link 106i may comprise, for example, a wired or wireless Ethernet link. The link 106j may comprise, for example, a wired or a wireless link.

In the exemplary embodiment of the invention illustrated in FIG. 1, although the devices 104a-104j, which may be communicatively coupled to only the broadband gateway 102, are shown, the invention may not be so limited. Accordingly, the devices 104a-104j, which may be communicatively coupled to multiple broadband gateways in a local or home network, may be implemented without departing from the spirit and scope of various embodiments of the invention.

In operation, the broadband gateway 102 may be utilized as an interface device that may allow one or more of the network access service providers 120 and/or the content providers 130 to interact with various devices in a home network, such as the home network 100a. The broadband gateway 102 may be operable to perform and/or provide various services that may pertain to enabling and/or facilitating reception of content, such as multimedia content, for example. The broadband gateway 102 may distribute the received content to one or more devices in the home network 100a for consumption.

The broadband gateway 102 may be operable to execute or run a software agent, a web robot (bot), and/or other like software program or application, which may perform a series of automated tasks for obtaining content from the wide range of content sources available to the broadband gateway 102 through the multiple network access service providers 120. Such tasks may comprise searching, finding, negotiating, purchasing, storing, and/or verifying content based on the preferences that a user may have and that may be stored in the broadband gateway 102 in the form of a user profile. In this regard, more than one software agent may be concurrently operated in connection with one or more users of the broadband gateway 102. As a result of the operations of a software agent, the broadband gateway 102 may receive content through one or more network access service providers 120 and may store the content in a portion of memory. When content is received from, for example, different network access service providers 120, the content may be stored in different areas of the memory.

In some embodiments, the broadband gateway 102 may receive content comprising a program or application through one or more of the network access service providers 120 and may store the content in a portion of a memory within the broadband gateway 102. The broadband gateway 102 may be operable to execute or run a software agent, a bot, and/or other like software program or application to request the content and/or to store the received content in the first portion of the memory. The broadband gateway 102 may execute the application after access by the application to one or more other portions of the memory is disabled. Since the application may have been received from an unknown and/or untrusted source, disabling access may protect data stored in those other portions from inappropriate use by the application. For example, when transcoding video data and/or handling decrypted data, the broadband gateway 102 may disable access by the application to the portions in memory where such data is stored such that the raw data may not be copied and/or modified by the application. After the execution of the received application is completed, access to those portions of the memory previously disabled may be enabled by the broadband gateway 102. When disabling may not be performed because the data that is to be protected is currently being used by other applications, then the broadband gateway 102 may not allow the received application to execute.

In some embodiments, the broadband gateway 102 may verify, through the software agent and/or by way of another software program or application, that the stored content is secure for utilization in the broadband gateway 102 and/or for distribution to one or more of the home devices 104a-104j in the home network 100a. When the stored content is secure for distribution, it may be combined with other content in the broadband gateway 102 and the combined content may be distributed across the home network 100a. When the stored content is not trusted, that is, when the stored content fails a verification operation, the broadband gateway 102 may delete the stored content from memory. In some instances, when the stored content comprises an application and fails a verification operation, the application may not be opened or allowed to execute in the broadband gateway 102.

Figure 2A:
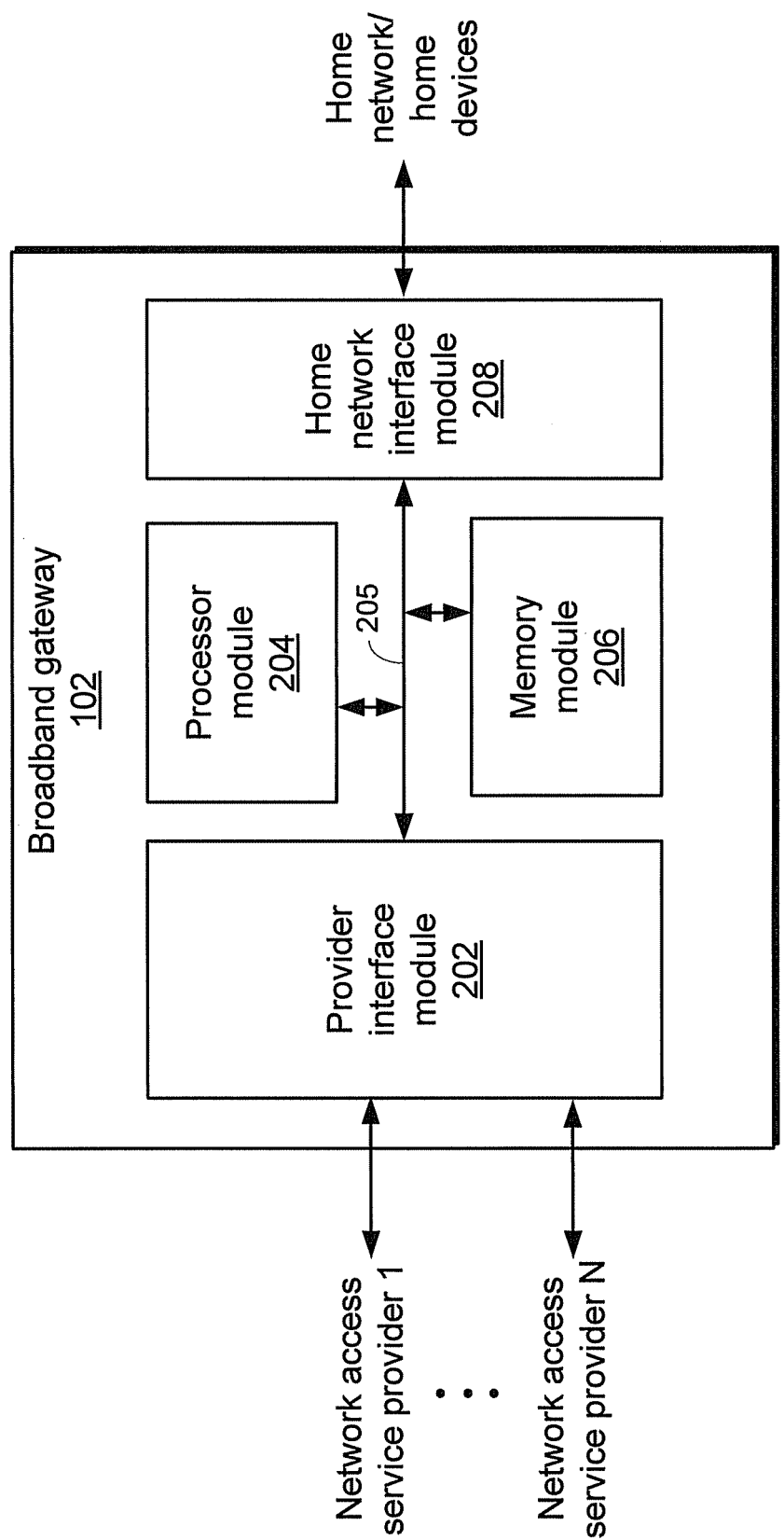
FIGS. 2A and 2B are block diagrams that illustrate exemplary broadband gateways, in accordance with embodiments of the invention.

FIG. 2A is a block diagram illustrating an exemplary broadband gateway, in accordance with an embodiment of the invention. Referring to FIG. 2A, there is shown a more detailed view of an exemplary architecture of the broadband gateway 102 described above with respect to FIG. 1. The broadband gateway 102 may comprise suitable logic, circuitry, code, and/or interfaces that may be operable to provide connectivity between one or more networks, such as the distribution networks 110, for example, and one or more devices in a home network, such as the home devices 104a-104j in the home network 100a. Access from the broadband gateway 102 to the distribution networks 110 may be provided through one or more of the network access service providers 120.

The broadband gateway 102 may operate as an interface device that allows one or more network access service providers 120 and/or content providers 130 to interact with various devices in the home network 100a, such as the home devices 104a-104j. Moreover, when more than one network access service provider 120 is utilized to provide access, the broadband gateway 102 may handle each of network access service providers 120 through a separate physical layer access.

The broadband gateway 102 may comprise suitable hardware and/or software to provide some or all of the functions and/or operations of one or more of a modem, a router, and a switch. The modem functions and/or operations may be those of a DSL modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a memory module 206, and a client network interface module 208. The modules in the broadband gateway 102 may communicate with one or more of the other modules through one or more buses and/or connections 205. In some instances, the broadband gateway 102 may be such that the various modules listed above may be distributed over multiple devices. In such instances, the buses and/or connections 205 may enable communication between the various modules across the multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data and/or to send data through one or more of the network access service providers 120, for example. The data received and/or sent may be associated with content from the content providers 130 and/or from the network access service providers 120. The provider interface module 202 may be operable to support multiple communication protocols, standards, and/or data transport technologies. As illustrated in FIG. 2A, the provider interface module 202 may be operable to interface with one or more of the network access service providers 120. In an embodiment of the invention, the provider interface module 202 may be operable to interface with N of the network access service providers 120. The provider interface module 202 may be communicatively coupled to the various network access service providers 120 via a plurality of broadband connections 108 described above with respect to FIG. 1.

The processor module 204 may comprise suitable logic, circuitry, code, and/or interfaces that may be operable to process data received and/or sent through one or more of the network access service providers 120, and/or data received from and/or sent to one or more devices in the home network 100a. In this regard, the processor module 204 may comprise one or more portions that are suitable to handle certain types of data such as video data and/or audio data, for example. For example, the processor module 204 may comprise a core processor (not shown), a video processor (not shown), and an audio processor (not shown).

The processor module 204 may be operable to execute a software agent, bot, or other like software program and/or application, which may be capable of performing a series of automated tasks. Such tasks may comprise searching, finding, negotiating, purchasing, storing, and/or verifying content in accordance with a set of user rules or preferences associated with a user profile that may be stored in the memory module 206. The processor module 204 may be operable to execute or run an application downloaded in connection with the download of content from third-party sources. Such content may be downloaded as a result of the operations of the software agent. The processor module 204 may be operable to execute or run other software programs and/or applications, such as content processing applications, for example, which may process content downloaded from third-party sources and/or content provided by a trusted or known source and stored in the memory module 206. In this regard, content processing may comprise combining, mixing, and/or adding content before distribution to any of the home devices 104a-104j in the home network 100a through the home network interface module 208.

In some instances, the processor module 204 may enable one or more virtual machines or other like secure processing frameworks in which to execute a downloaded application in a secure and isolated environment. For example, the processor module 204 may support running system virtual machines that enable a complete system platform that supports the execution of a complete operating system (OS). The processor module 204 may support running process virtual machines that enable running a single program or application, typically as a single process. By enabling the use of virtual machines, downloaded applications may be allowed to execute in a secure environment that may be utilized to verify the downloaded application and/or to restrict the actions that such downloaded applications may perform.

In some embodiments, the processor module 204 may comprise a separate processor that may be utilized to execute downloaded programs or applications in a contained processing environment. The contained processing environment may also include a separate memory in the memory module 206. By completely containing the application to a processor and a memory in a separate processing environment from that used by the broadband gateway 102 to carry out other functions, the application may be restricted to such environment and may be executed safely.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media that may be integrated in the broadband gateway 102 and/or may be removable such as a removable storage device.

The memory module 206 may be utilized to store one or more user profiles and/or one or more content directories. A user profile, as described above, may comprise a set of preferences for a particular user that may be utilized with the operations of a software agent or other like software program and/or application. A content directory may comprise information, including programming scheduling information, related to content that may be available to the broadband gateway 102 through one or more of the network access service providers 120. A content directory may also comprise information related to content that may be available to the broadband gateway 102 from one or more of the home devices 104a-104j and/or related to content that is locally available in the memory module 206.

In some embodiments, the memory module 206 may be operable to store content received from known and/or trusted sources in a first portion or area of memory. The memory module 206 may be operable to store, in another area of memory, content received from third-party sources, where such content may be received as a result of the operations of a software agent, for example. In this manner, content from an unknown source and/or content that may pose a threat can be maintained isolated, contained, and/or quarantined. When the content comprises a program or application, such program or application may be executed but may not be granted access to certain areas of memory to maintain the data in those areas protected from inappropriate use by the application. In some instances, the content may be verified to determine whether it is secure for utilization in the broadband gateway 102 and/or for distribution in the home network 100a.

The client network interface module 208 may comprise suitable logic, circuitry, code, and/or interfaces that may be operable to receive data from and/or send data to one or more devices in the home network. The client network interface module 208 may be operable to support multiple communication protocols, standards, and/or data transport technologies.

In operation, the broadband gateway 102 may be execute or run a software agent in the processor module 204. As a result of the operations of the software agent, the broadband gateway 102 may receive content through one or more network access service providers 120. The content may be received through the provider interface module 202. The content received by the broadband gateway 102 may be stored in a portion of the memory module 206. In some embodiments, when content is received from different network access service providers 120, the content may be stored in different areas of the memory module 206.

When the content comprises a program or application, the broadband gateway 102 may execute the application after access by the application to one or more portions of the memory module 206 is disabled. The disabling of portions of the memory module 206 may be performed to restrict the application from accessing certain data within the broadband gateway 102. When the disabling may not be performed, such as when the data is being accessed or processed by other applications, then the broadband gateway 102 may not allow the received application to execute. After the execution of the received application is completed, access to those portions of the memory module 206 that were previously disable may now be enabled by the broadband gateway 102.

In some embodiments, the broadband gateway 102 may verify, through the software agent and/or by way of another software program or application executing on the processor module 204, that the stored content is secure for utilization in the broadband gateway 102 and/or for distribution to one or more of the home devices 104a-104j in the home network 100a. When the stored content is secure for distribution, it may be combined with other content by a software program or application executing on the processor module 204. The combined content may be distributed to devices in the home network 100a through the home network interface module 208. When the stored content is not trusted, that is, when the stored content fails a verification operation, the software agent may delete the stored content from the memory module 206. Moreover, when the stored content comprises an application and fails a verification operation, the software agent may not allow the application to be opened or executed on the processor module 204.

Figure 2B:
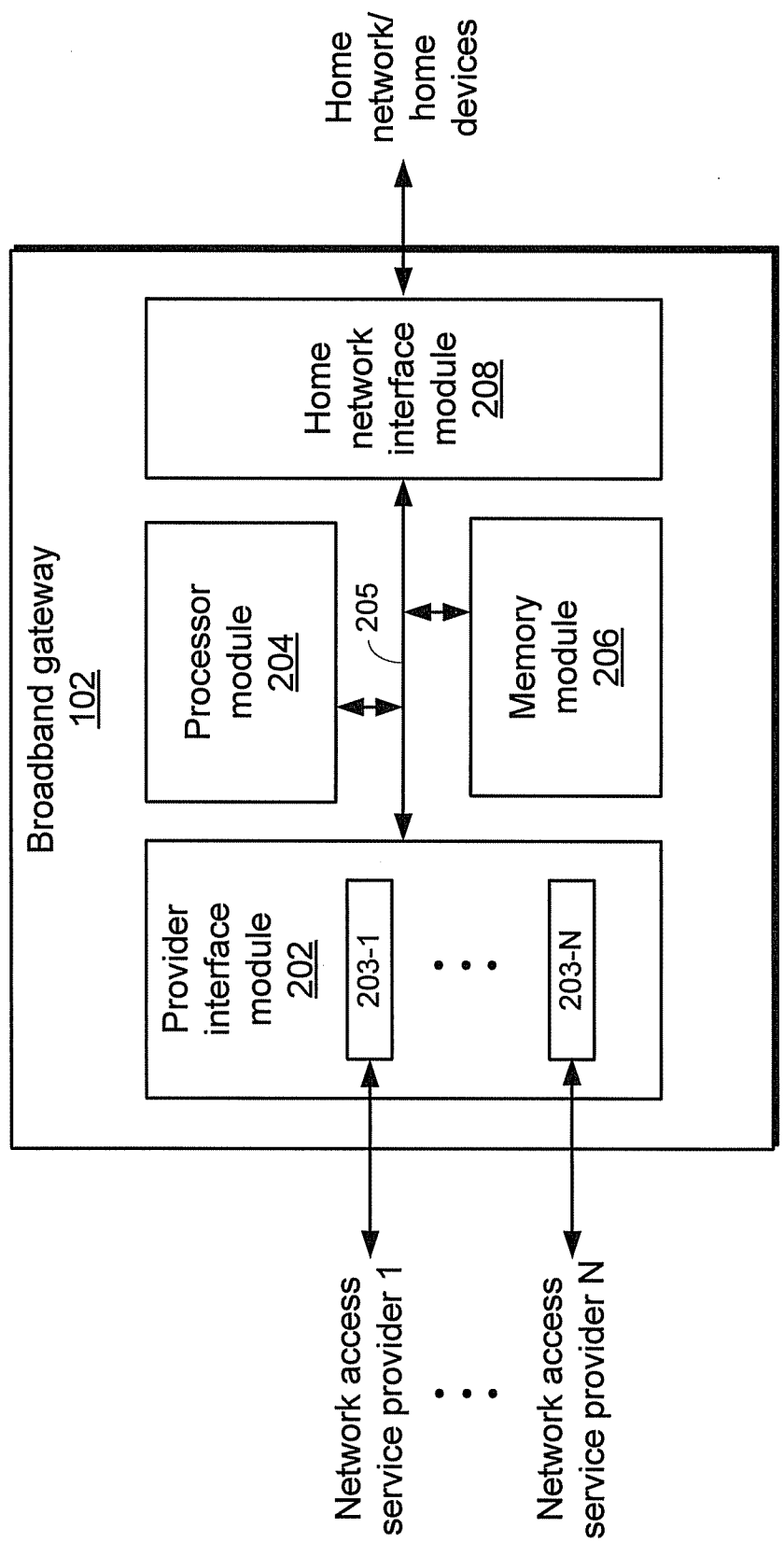

FIG. 2B is a block diagram illustrating an exemplary broadband gateway, in accordance with another embodiment of the invention. Referring to FIG. 2B, there is shown the broadband gateway 102 with the provider interface module 202 comprising N separate network interfaces 203-1, . . . , 203-N, each of which is associated with one of the N network access service providers 120. In this manner, the broadband gateway 102 may separately interface with the network access service providers 120. The network interfaces 203-1, . . . , 203-N may enable the broadband gateway 102 to handle separate physical layer access for each of the N network access service providers 120. For example, the broadband gateway 102 may interface with each of a cellular service provider, a CATV provider, a satellite television provider, an ISP, and/or POTS provider through a separate network interface, each of which comprises suitable logic, circuitry, code, and/or interfaces to enable physical layer access.

Figure 3:
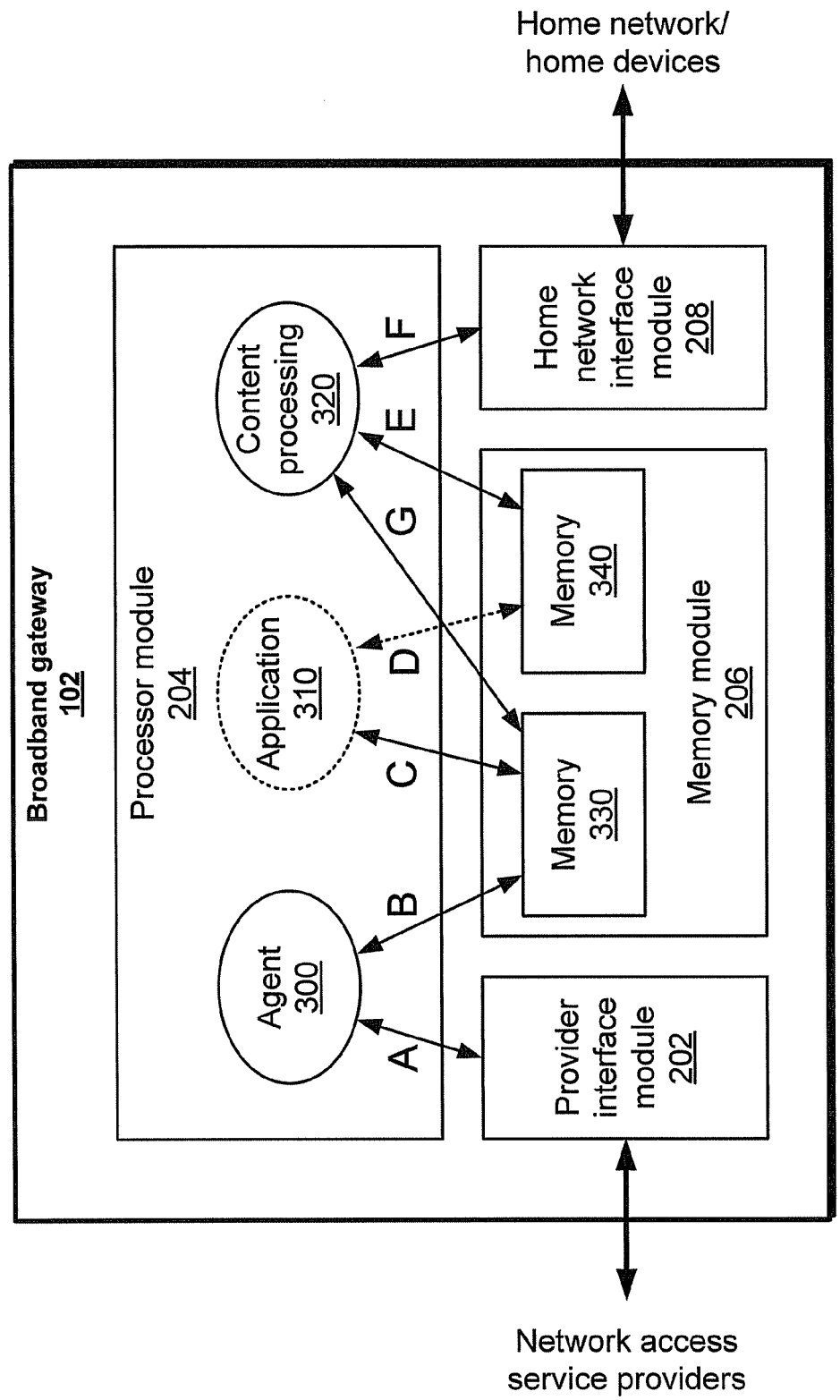
FIG. 3 is block diagram that illustrates an exemplary scenario in which content has been received by a broadband gateway from a third-party source, in accordance with embodiments of the invention.

FIG. 3 is block diagram that illustrates an exemplary scenario in which content has been received by a broadband gateway from a third-party source, in accordance with an embodiment of the invention. Referring to FIG. 3, there is shown the broadband gateway 102 described above with respect to FIGS. 2A and 2B. Also shown are various software programs or applications that may be run or executed on the processor module 204 in connection with content downloaded to the broadband gateway 102. For example, a software agent 300, an application 310, and/or a content processing application 320 may be executed on the processor module 204. In some instances, such as when the application 310 is being verified and/or being utilized to handle content, the application 310 may be executed on a separate framework, such as a virtual machine, for example, supported by the processor module 204. In other instances, the application 310 may be executed on a contained processing environment having a separate and dedicated processor and memory, for example.

The memory module 206 may comprise a memory 330 and a memory 340. The memory 330, which may be referred to as a secure memory, may be utilized to store content that is received from third-party sources. In many cases, third-party sources may be unknown or untrusted sources and content received from those sources may pose a threat to the operation of the broadband gateway 102. The memory 330 allows the stored content to remain isolated, contained, and/or quarantined. In some embodiments, the received content may be verified to determine whether such content compromises the operations of the broadband gateway 102, the operations of the home network 100a, and/or the operations of any of the home devices 104a-104j. In such instances, the verification may be performed by the software agent 300 or other like software program or application.

The memory 340 may be a different portion of memory in the memory module 206 than that of the memory 330. The memory 340 may be utilized to store content received from a known and/or authorized source of content. For example, when a user has agreements to receive and store content from one or more sources of content, the content received from those sources may be stored in the memory 340. Content from known and/or authorized sources is typically not considered to be a threat and, therefore, may not need to be contained or isolated. The content stored in the memory 340 may also be content that has been verified and is no longer considered to be a possible threat and/or no longer likely to comprise malicious software. The memory 340 may also be utilized to store user profiles and/or content directories, for example.

The memory 340 may also be utilized to store data associated with operations being carried out by the broadband gateway 102. For example, when transcoding video data and/or handling decrypted data, the broadband gateway 102 may store the raw data associated with those operations in the memory 340. Other operations performed in the broadband gateway 102 may also result in raw data being available in the memory 340. However, raw data in the memory 340 may need to be protected from being copied, modified, and/or altered in any way by applications that are not authorized to do so.

In an embodiment of the invention, the memory 330 and the memory 340 may be different portions of memory in a single memory integrated circuit (IC) or chip. In another embodiment of the invention, each of the memory 330 and the memory 340 may be associated with a separate memory IC or chip. In some embodiments, the memory 330 and the memory 340 may be associated with separate processing environments within the broadband gateway 102. The portions of the memory module 206 that are allocated to the memory 330 may be allocated through a hardware-mapped memory or hardware-reserved memory approach in which access to the memory 330 is restricted to certain hardware components and/or processes of the broadband gateway 102. Moreover, the manner in which memory resources are allocated to the memory 330 may enable both a physical and/or a logical isolation of the memory 330.

Similarly, the portions of the memory module 206 that are allocated to the memory 340 may be allocated through a hardware-mapped memory or hardware-reserved memory approach in which access to the memory 340 is restricted to certain hardware components and/or processes of the broadband gateway 102. Moreover, the manner in which memory resources are allocated to the memory 340 may enable both a physical and/or a logical isolation of the secure memory 340. By enabling some or all of the memory 340 to be isolated, data stored in those isolated portions of the memory 340 may not be accessed by unauthorized applications, such as applications that may have been downloaded into the broadband gateway 102 from third-party sources, for example.

In the exemplary scenario of FIG. 3, the broadband gateway 102 may utilize a content directory that comprises information about the content that is available to a user of the broadband gateway 102. The information associated with the content directory may be stored in the memory 340, for example. As described above, the content directory need not only comprise information about the content that may be received by the broadband gateway 102 through one or more of the network access service providers 120, but may also comprise information about the content that may be available from any one of the home devices 104a-104j in the home network 100a and/or about content locally stored in the memory module 206. The information in the content directory may be presented to the user through a graphical user interface (GUI) such as an electronic programming guide (EPG) or an interactive programming guide (IPG), for example, which may be displayed in one of the home devices 104a-104j such as the television 104a, for example. The user may utilize the information that is presented to make decisions regarding the content that he or she wishes to receive and/or the manner in which he or she wishes to receive or consume such content.

The software agent 300, and/or other like software program or application, may be utilized for searching, finding, negotiating, purchasing, verifying, and/or storing content. In this regard, the software agent 300 may perform a series of automated tasks based on, for example, a set of rules associated with a user profile. Such user profile, like the content directory, may be stored in the memory 340, for example. The user profile may indicate a particular user's preferences with respect to the type and/or capabilities of the devices in which that user receives, displays, and/or reproduces content. The user profile may indicate preferences with respect to the quality, type, genre, and/or cost of content for that particular user. The user profile may also indicate security preferences such as the type of actions, tasks, features, and/or operations that the user may restrict downloaded content, including software programs or applications, to perform.

As a result of the operations of the software agent 300, the broadband gateway 102 may receive content, and/or information about the content, from a third-party source and/or from a known and trusted source. Accordingly, the content directory may need to be updated to reflect the most current and/or complete information about the content that is available to the user for consumption.

When content is received from a third-party source by the broadband gateway 102, the content may be stored in the memory 330 of the memory module 206. The stored content may be kept isolated, contained, and/or quarantined from other sections of the broadband gateway 102. When the content comprises a program or application, such as the application 310, the program or application may be executed on the processor module 204. Once it is being executed, the application 310 may have access to the memory 330, where the content that is associated with the application 310 is stored. The application 310, however, may have restricted or limited access to the memory 340. For example, the downloaded application 300 may not have access to the memory 340 at all. In another example, the application 310 may not have access to certain portions of the memory 340. Access to the memory 340 may be limited by disabling access to some or all of the memory 340. Once the application 300 completes execution, the broadband gateway 102 may enable access to those portions of the memory 340 that were previously disabled. In this regard, the broadband gateway 102 may not enable the execution of the application 300 until access to the appropriate portions of the memory 340 is disabled.

In operation, the software agent 300 may search, find, and negotiate with a third-party source, or a known and trusted source, for content in accordance with the preferences and interests of a user. The content, and/or information related to the content, may be downloaded to the broadband gateway 102 through the provider interface module 202. The downloaded content, when received from an unknown and/or untrusted source, may be communicated to the software agent 300, as shown by a link A in FIG. 3, which in turn stores the content in the memory 330, as shown by a link B. The stored content may comprise a program or application that may be executed on the processor module 204, such as the application 310. The application 310 may have access to the content in the memory 330, as shown by a link C. The application 310, however, may have limited or no access to the memory 340, as shown by a dotted-line link D. As indicated above, access to the memory 340 by the application 310 may be limited by disabling access to one or more portions or areas of the memory 340.

In some embodiments, the software agent 300, and/or other like software program or application, may be utilized to verify that the content stored in the memory 330 is secure and does not pose a threat. The verification operations performed by the software agent 300 may determine whether the stored content is secure, that is, may be utilized and/or distributed, or the stored content is not secure and should instead be deleted.

In those instances when the stored content in the memory 330 comprises a downloaded application, such as the application 310, the software agent 300 may be utilized to verify that the downloaded application is secure. For example, in the exemplary scenario of FIG. 3, the application 310 associated with the stored content may be utilized to update the content directory in the memory 340 to reflect the availability in the broadband gateway 102 of the content downloaded from the third-party source. In this regard, the application 310, if it were to execute, may access the memory 340 to add information about the content stored in the memory 330. Such a feature of the application 310 may not pose a threat and may be considered secure by the software agent 300. Accordingly, the application 310 may be verified by the software agent 300 and be allowed to execute and access a portion of the memory 340 to perform the appropriate update of the content directory.

The application 310 may support other features, such as ones that may attempt to read information from the content directory, from the memory 340, and/or from other portions of the memory module 206. Such reading of information may represent a security breach, as raw data, passwords, preferences, and/or personal viewing habits information may be obtained and reported back to some entity without the user's permission. The entity collecting such information may try to sell the information to other parties and/or may utilize the information to send targeted and unwanted advertisement, hijack operations by inserting unwanted content into video and/or audio streams, or worse. In such an instance, the software agent 300 may determine that the application 310 poses a threat and may not allow the application 310 and its associated content to be utilized and/or distributed. Accordingly, the software agent 300 may delete the content stored in the memory 330.

The rules utilized by the software agent 300, however, may enable the software 310 to pass verification if it is possible to execute the software 310 in an environment in which any attempts to access the memory 340 are restricted to updating the information in the content directory about the content stored in the memory 330. Such a controlled or restricted environment may be achieved by executing the software 310 in a controlled framework, such as a virtual machine, for example, in which access to the memory module 206 is limited to secure operations. Another form of a controller or restricted environment may be achieved by having a contained processing environment in the broadband gateway 102. Such contained processing environment, an example of which is provided below, may comprise dedicated portions of the processor module 204, and/or of another processor module (not shown), as well as dedicated portions of the memory module 206, and/or of another memory module (not shown), that may be utilized to just to handle content and/or applications received from unknown and/or untrusted sources.

The verification described above with respect to the software agent 300 may be performed automatically, that is, the rules provide for which features, actions, tasks, and/or operations of the application 310 may be allowed and/or which ones may not be allowed in order to determine whether the application 310 may pass verification. The verification may also be performed, at least partially, through a series of prompts generated by the software agent 300, for example, requesting user input or instructions during the verification process. For example, the software agent 300 may determine that the application 310 may attempt to read personal viewer habits information stored in the memory module 206. The software agent 300 may generate a request for input from the user as to whether the application 310 is to be authorized to perform such a task and therefore be allowed to pass verification. On one hand, the user may provide instructions that the application 310 is to be authorized to read personal viewer habits information and/or other information, and consequently, the application 310 may pass verification. On the other hand, the user may indicate that the application 310 is not to be allowed to read information and, and consequently, the downloaded application 310 fails verification.

The request generated by the software agent 300 may provide the user with various options that may simplify future verification operations. For example, the request may not only require that the user provide input or instructions for this particular instance, but may also ask the user whether future instances like this one are to be always allowed, always denied, or decided on a case-by-case basis. Based on the user feedback, such preferences may be stored in the user profile and may be utilized in future verification operations when appropriate.

FIG. 3 further shows the content processing application 320, which may compile the information associated with the content directory in a manner that may be presented to the user through a user interface. In this regard, the content processing application 320 may obtain the content directory information, as shown by a link E, may organize and format the information, and may communicate the information through the home network interface module 208 to one or more of the home devices 104a-104j to be presented to a user, as shown by a link F. The content directory information may comprise information about the content received when, for example, the application 310 is allowed to update such information. Once presented with the various options of available content through a graphical user interface, a user may select to consume the downloaded content. In such a case, the content processing application 320, and/or other like software program or application, may retrieve the downloaded content from the memory 330, as shown by the link G, and may communicate the downloaded content to the appropriate home device.

Figure 4A:
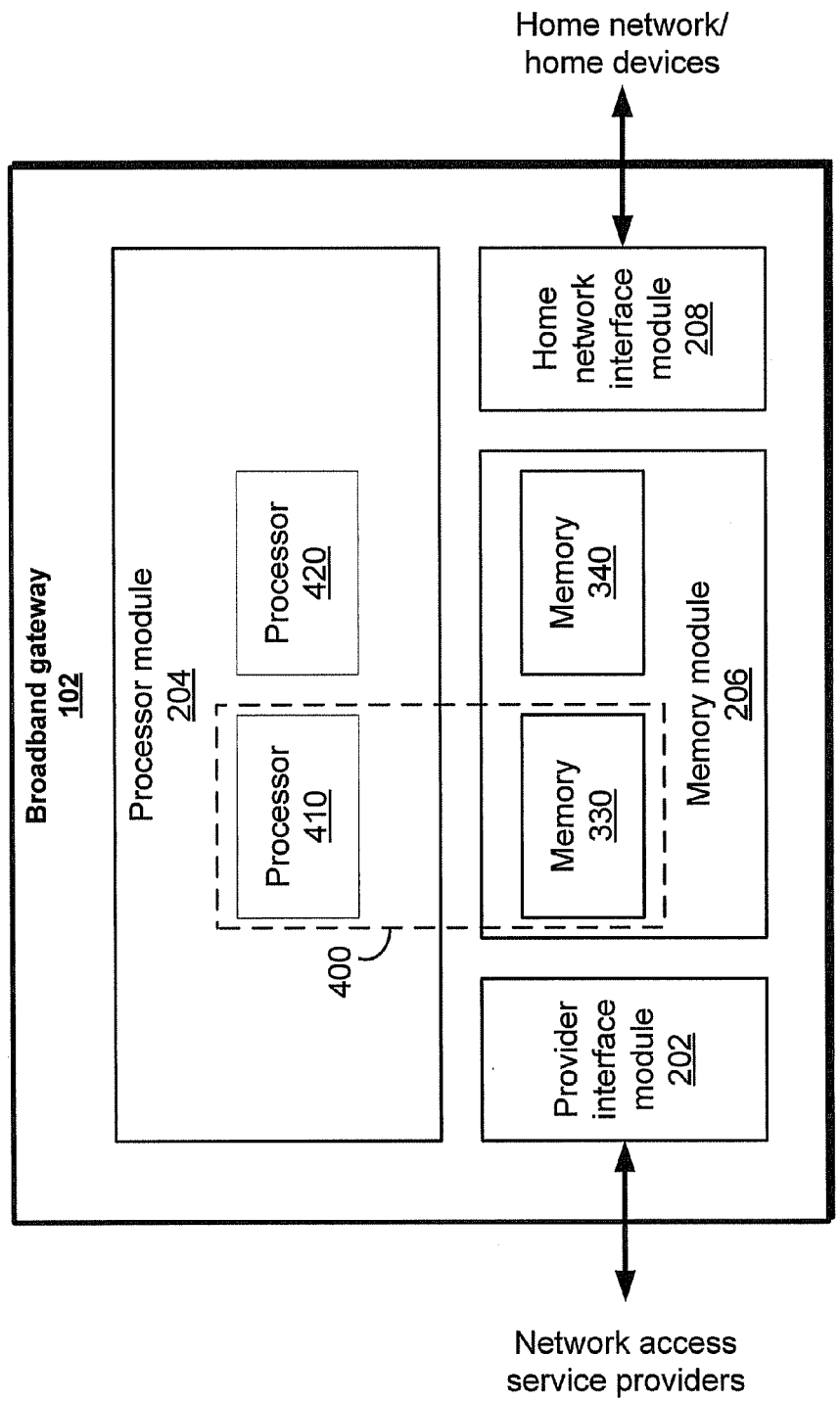
FIGS. 4A and 4B are block diagrams that illustrate a broadband gateway having a contained processing environment for content received from a third-party source, in accordance with an embodiment of the invention.
Figure 4B:
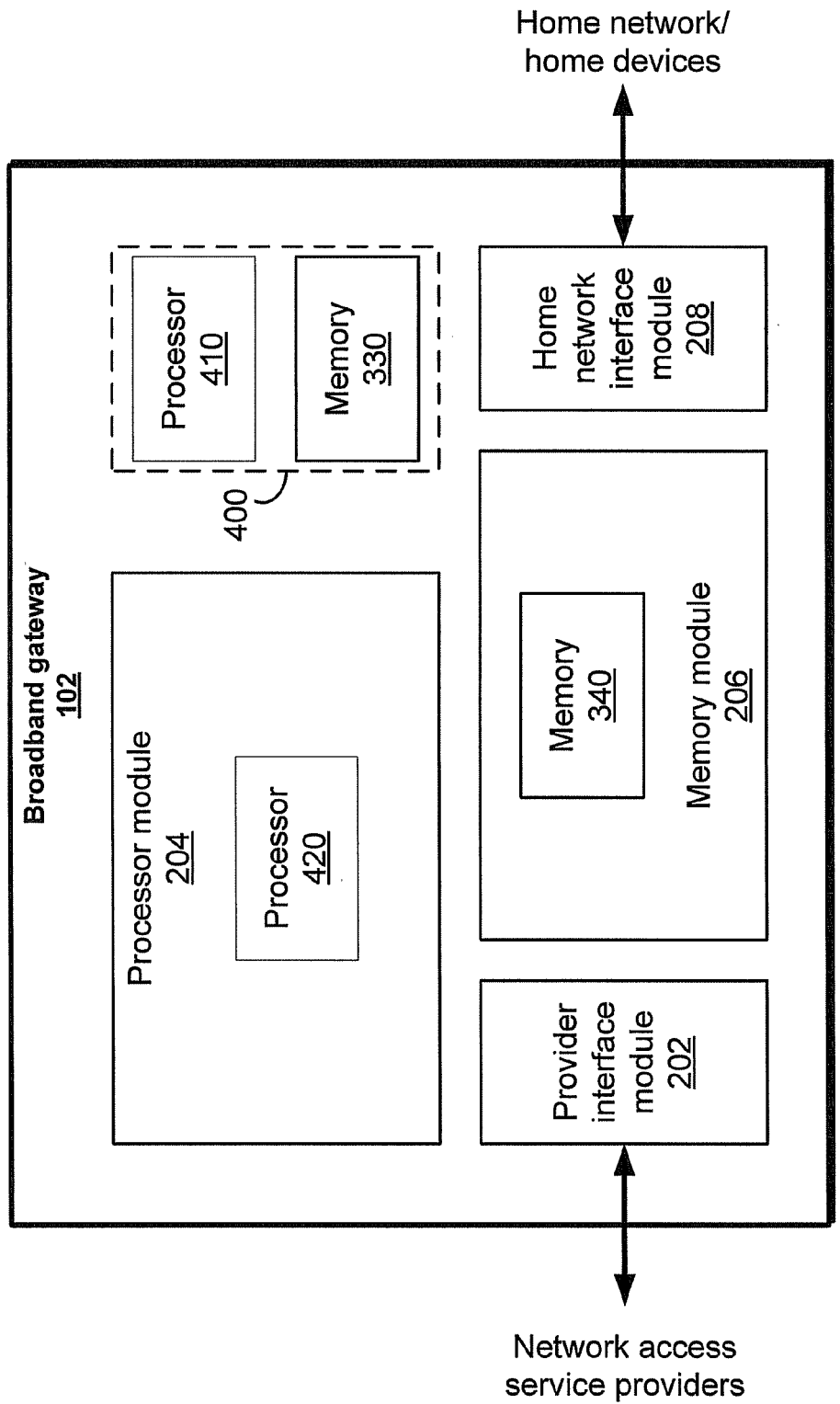

FIGS. 4A and 4B are block diagrams that illustrate a broadband gateway having a contained processing environment for content received from a third-party source, in accordance with an embodiment of the invention. Referring to FIG. 4A, the processor module 204 is shown having a processor 410 and a processor 420. The processor 420 may be operable to run or execute a wide range of programs or applications associated with the operation of the broadband gateway 102. The processor 420 may be operable to run or execute programs or applications received from known or trusted sources through one or more of the network access service providers 120 via the provider interface module 202.

The processor 410 may be operable to run or execute programs or applications received from unknown or untrusted third-party sources as a result of a request from, for example, the software agent 300 described above with respect to FIG. 3. The processor 410 and the memory 330 may be configured to operate as a contained processing environment 400 that is dedicated to handle content, including programs or applications, which is received from unknown or untrusted third-party sources and that may pose a threat to the data contained in the broadband gateway 102 and/or to the operation of the broadband gateway 102. In this regard, verification of the content received from unknown or untrusted third-party sources may not be required since the content and any application that is executed from such content is contained or isolated within the contained processing environment 400. Moreover, because of the contained nature of the processing environment, portions of the memory 340 may not need to be disabled when an application from an unknown or untrusted third-party source is executed on the processor 410.

Referring to FIG. 4B, there is shown a different embodiment in which the processor 410 and the memory 330 in the contained processing environment 400 may be implemented separately from the processor module 204 and from the memory module 206. In this embodiment, content received from an unknown or untrusted third-party source may be stored in the memory 330 through a software agent, such as the software agent 300 described above. Moreover, when such stored content comprises an application, the application may be executed on the processor 410 without interfering with any other process, program, or application being executed on the processor module 204.

Figure 5:
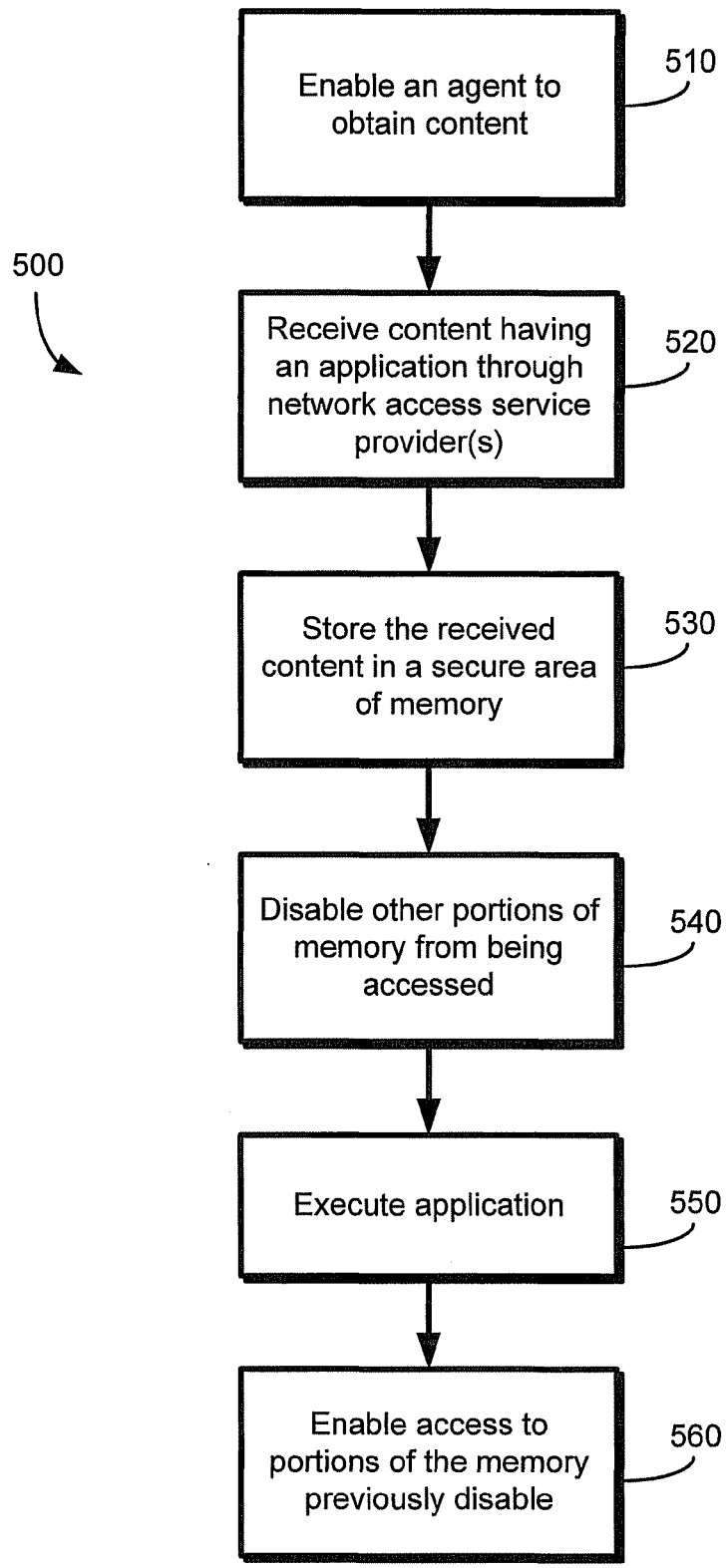
FIG. 5 is a flow diagram that illustrates exemplary steps in the handling of content received from a third-party source, in accordance with an embodiment of the invention.

FIG. 5 is a flow diagram that illustrates exemplary steps in the handling of content received from a third-party source, in accordance with an embodiment of the invention. Referring to FIG. 5, there is shown a flow chart 500 related to the execution of a downloaded application from an unknown or untrusted third-party source as described above with respect to FIG. 3, for example. In step 510, the broadband gateway 102 may enable an agent, such as the software agent 300, to obtain content in accordance with the preferences and/or interests of a user. At step 520, the broadband gateway 102 may receive content as a result of the operations of the agent in step 510. The content comprises a software program or application. The content may also comprise video data, audio data, multimedia data, text, graphics, and/or configuration information, for example. The content may be received through one or more of the network access service providers 120.

At step 530, when the content received is from a third-party source, the agent may store the content in the memory 330 in the memory module 206, for example. At step 540, access to portions of the memory 240 in the memory module 206 may be disabled. Those portions of the memory 240 may comprise data, such as raw data, which may need to be protected from unauthorized use, such as copying, modifying, and/or altering, for example. At step 550, the processor module 204 may execute the program or application associated with the stored content. When a contained processing environment is implemented, such as the contained processing environment 400 having the processor 410 described above with respect to FIGS. 4A and 4B, the contained processing environment may be utilized to execute the program or application. Once the program or application has completed execution, in step 560 the previously disabled portions of the memory 340 may be enabled for access.

Figure 6:
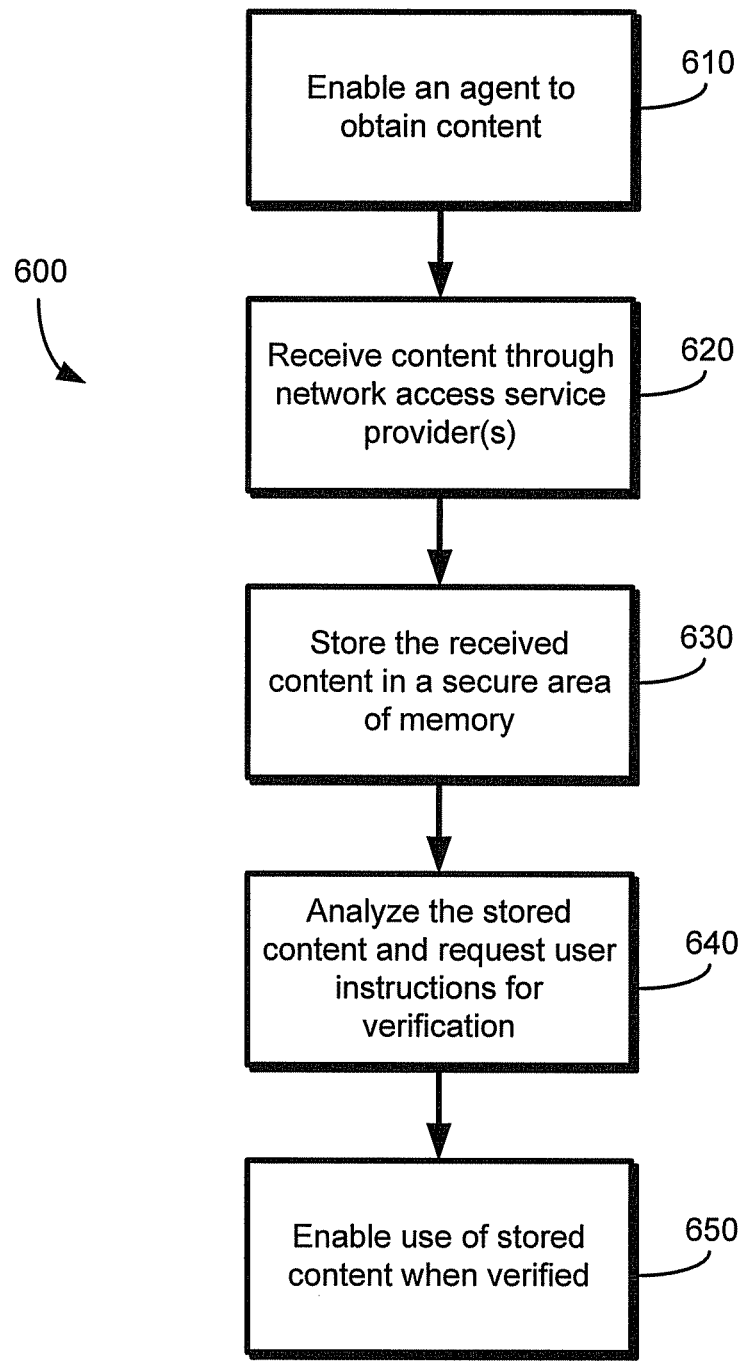
FIG. 6 is a flow diagram that illustrates exemplary steps for the verification of content received by a broadband gateway from a third-party source, in accordance with an embodiment of the invention.

FIG. 6 is a flow diagram that illustrates exemplary steps for the verification of content received by a broadband gateway from a third-party source, in accordance with an embodiment of the invention. Referring to FIG. 6, there is shown a flow chart 600 related to the verification of downloaded content as described above with respect to FIG. 3, for example. In step 610, the broadband gateway 102 may enable an agent, such as the software agent 300, to obtain content in accordance with the preferences and/or interests of a user. The software agent 300 may negotiate with, for example, a third-party source. In some instances, the software agent 300 may negotiate with a known and/or trusted source of content.

At step 620, the broadband gateway 102 may receive content as a result of the operations of the agent in step 610. The content may comprise video data, audio data, multimedia data, text, graphics, configuration information, and/or software programs or applications, for example. The content may be received through one or more of the network access service providers 120. The content may be received from a third-party source or from a known and/or trusted source. At step 630, when the content received is from a third-party source and may therefore pose a threat, the agent may store the received content in a secure area of memory, such as the memory 330 in the memory module 206, for example. When the content is received from a known and/or trusted source, the agent may store the received content in another area of memory, such as the memory 340, for example.

At step 640, the agent may verify that the content stored in the secure area of memory is safe for utilization and/or for distribution. During the verification operation, the agent may request instructions or input from the user regarding the content being verified. For example, the agent may ask whether a certain type content, and/or a certain type of action associated with the content, is to be allowed every time, to be denied every time, or to be decided on a case-by-case basis. At step 650, once the stored content is verified, the agent may allow the content to be utilized and/or distributed. When the stored content fails verification, the agent may remove or delete the stored content. In some instances, the removal or deletion of the stored content may be time-based. For example, the removal or deletion of the stored content may be scheduled to occur within a certain time from the time that the stored content failed verification.

In some embodiments, the content received from a third-party source and verified by the broadband gateway 102 may be combined with other content in the broadband gateway 102. For example, downloaded content comprising advertisement and/or commercial information, and/or video image data, for example, may be combined with content received by and/or stored in the broadband gateway 102 such as content comprising audio data and/or different video image data. In another example, downloaded content comprising audio data may be combined with content received by and/or stored in the broadband gateway 102 such as content comprising different audio data and/or video image data.

Although various scenarios have been described above, those scenarios are provided by way of illustration and not of limitation. Variations to those scenarios may be contemplated for securing a home domain from external threats received by a broadband gateway.

According to an embodiment of the invention, a method and/or system may utilize a broadband gateway, such as the broadband gateway 102 described above, may enable communication with a plurality of devices, such as the home devices 104a-104j, for example. The broadband gateway 102 may be operable to handle at least one physical layer connection to at least one corresponding network access service provider, such as the network access service providers 120, for example. In this regard, the at least one physical layer connection may comprise a plurality of physical layer connections and the at least one corresponding network access service provider may comprise a plurality of corresponding network access service providers, and wherein each of the plurality of physical layer connections corresponds to a respective one of the plurality of corresponding access service providers.

The broadband gateway 102 may receive content through the at least one corresponding network access service provider 120. In this regard, the content may be received through the provider interface module 202 of the broadband gateway 102, for example. The broadband gateway 102 may store the received content in a secure portion of memory, such as the memory 330 of the memory module 206, for example. The broadband gateway 102 may verify that the stored content is secure for one or both of utilization in the broadband gateway 102 and distribution from the broadband gateway to one or more of the home devices 104a-104j. When the stored content fails the verification, the broadband gateway 102 may delete the stored content from the memory 330.

The broadband gateway 102 may have an agent, such as the software agent 300 described above, for example, being executed on the processor module 204. Such agent may enable the generation of a request for the content, the storage of the received content in the memory 330, and/or the verification of the stored content. The software agent 300 may enable verification of the stored content by presenting a user with security information associated with the stored content and requesting instructions for handling the stored content from the user. The instructions requested for handling the stored content may be based on historical instruction information associated with the user, which may be stored in the memory module 206.

When the stored content is verified to be secure for distribution, the broadband gateway 102 may combine the stored content with other content stored in the broadband gateway 102. In such an instance, the broadband gateway 102 may distribute the combined content to the one or more of the home devices 104a-104j.

When the stored content comprises advertisement and the stored content is verified to be secure for distribution, the broadband gateway 102 may combine the advertisement with video content stored in the memory 340. In such an instance, the broadband gateway 102 may distribute the combined content to the one or more of the home devices 104a-104j having video display capabilities.

In some instances, the memory module 206 may comprise a first secure portion and a second secure portion, which need not overlap each other. The first secure portion may be operable to store content received through a first network access service provider from the at least one corresponding network access service provider 120, while the second secure portion may be operable to store content received through a second network access service provider from the at least one corresponding network access service provider 120.

In some instances, the stored content may comprise an application and the verification of the stored content by the broadband gateway 102 may comprise determining whether the application is secure for execution on the broadband gateway 102. When the application is verified to be secure for execution on the broadband gateway 102, the broadband gateway 102 may execute the application to enable the addition of information associated with the stored content into a content directory in the broadband gateway 102. The content directory may be stored in the memory 340, for example.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for securing a home domain from external threats received by a gateway.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a broadband gateway that enables communication with a plurality of devices, wherein the broadband gateway is operable to handle at least one physical layer connection to at least one corresponding network access service provider:
storing an application received through the at least one corresponding network access service provider in a first portion of a memory;
storing, in a second portion of memory that does not overlap the first portion of the memory, raw data used during video processing that is performed in the broadband gateway; and
executing the application in a processor after disabling access by the application to the second portion of the memory, the access being disabled in response to a status of a usage of the raw data.

2. The method of claim 1, wherein the at least one physical layer connection comprises a plurality of physical layer connections and the at least one corresponding network access service provider comprises a plurality of corresponding network access service providers, and wherein each of the plurality of physical layer connections corresponds to a respective one of the plurality of corresponding access service providers.

3. The method of claim 1, comprising enabling access to the second portion of the memory by the broadband gateway after execution of the application.

4. The method of claim 1, comprising executing the application in a virtual machine operating on the processor.

5. The method of claim 1, comprising executing an agent on the broadband gateway, the agent enabling one or more of generating a request for the content and storing the received content in the first portion of the memory.

6. The method of claim 1, comprising verifying that the application is secure for one or both of utilization in the broadband gateway and distribution from the broadband gateway to one or more of the plurality of devices.

7. The method of claim 6, comprising deleting the application when verification fails.

8. The method of claim 6, wherein the verification is based on historical instruction information associated with the user.

9. A system, comprising:
one or more processors and/or circuits for use in a broadband gateway that enables communication with a plurality of devices,
wherein the broadband gateway is operable to handle a plurality of physical layer connections to a corresponding plurality of network access service providers, wherein each of the plurality of physical layer connections corresponds to a respective one of the plurality of corresponding access service providers, the broadband gateway comprising one or more processors and/or circuits operable to:
store an application received through a first one of the network access service providers in a first secure portion of a memory;
store content received through a second one of the network access service providers in a second secure portion of a memory distinct from the first secure portion; and
execute the application after disabling access by the application to a second portion of the memory that does not overlap the first portion of the memory, the access being disabled in response to a status of a usage of the content.

10. The system of claim 9, wherein the one or more processors and/or circuits are operable to enable access to the second portion of the memory by the broadband gateway after execution of the application.

11. The system of claim 9, wherein the one or more processors and/or circuits are operable to execute an agent on the broadband gateway, the agent enabling one or more of generating a request for the content and storing the received content in the first portion of the memory.

12. The system of claim 9, wherein the one or more processors and/or circuits are operable to verify that the application is secure for one or both of utilization in the broadband gateway and distribution from the broadband gateway to one or more of the plurality of devices.

13. The system of claim 12, wherein the one or more processors and/or circuits are operable to delete the application when verification fails.

14. The method of claim 1, wherein the video processing comprises transcoding, decrypting, or a combination thereof.

15. The method of claim 1, comprising:
determining whether the disabling was successful; and
in response to the determination that the disabling was not successful, preventing execution of the application.

16. A method, comprising: in a broadband gateway that enables communication with a plurality of devices, wherein the broadband gateway is operable to handle at least one physical layer connection to at least one corresponding network access service provider:

receiving an application through the at least one corresponding network access service provider;
storing the received application in a first portion of a memory of the broadband gateway;
storing a user profile in a second portion of memory that does not overlap the first portion of the memory;
executing an agent that downloads content to the second portion of memory in accordance with the user profile; and
executing the application in a processor after disabling access by the application to the second portion of the memory, the access being disabled in response to a status of a usage of the content.

17. The method of claim 16, wherein the agent performs one or more tasks in accordance with the user profile, wherein the one or more tasks include searching for the content, purchasing of the content, and verifying the content.

18. The method of claim 17, comprising executing the agent on the broadband gateway, the agent enabling one or more of generating a request for the content and storing the received content in the memory.

19. The method of claim 16, wherein the agent downloads a content directory from the network access service provider and stores the downloaded content directory in the second portion of the memory.

* * * * *